(12) United States Patent
Macken

(10) Patent No.: US 9,192,192 B1
(45) Date of Patent: Nov. 24, 2015

(54) METHOD AND APPARATUS FOR TREATING LOW QUALITY FORAGE

(71) Applicant: Performance Plus Liquids, Inc., Palmer, NE (US)

(72) Inventor: Casey Macken, Grand Island, NE (US)

(73) Assignee: Performance Plus Liquids, Inc., Palmer, NE (US)

( * ) Notice: Subject to any disclaimer, the term of this patent is extended or adjusted under 35 U.S.C. 154(b) by 319 days.

(21) Appl. No.: 13/752,776

(22) Filed: Jan. 29, 2013

Related U.S. Application Data

(60) Provisional application No. 61/592,164, filed on Jan. 30, 2012, provisional application No. 61/719,607, filed on Oct. 29, 2012.

(51) Int. Cl.
    *B02C 23/00*   (2006.01)
    *A23N 17/00*   (2006.01)
    *B02C 23/38*   (2006.01)
    *B02C 23/06*   (2006.01)

(52) U.S. Cl.
    CPC .............. *A23N 17/001* (2013.01); *B02C 23/06* (2013.01); *B02C 23/38* (2013.01); B02C 23/00 (2013.01)

(58) Field of Classification Search
    CPC ........ B02C 23/00; B02C 23/06; B02C 23/18; B02C 23/38; B02C 23/40
    USPC .......................................... 241/21, 101.8, 38
    See application file for complete search history.

(56) References Cited

U.S. PATENT DOCUMENTS

| | | | | |
|---|---|---|---|---|
| 4,767,064 A | * | 8/1988 | Resch | 241/21 |
| 5,353,998 A | * | 10/1994 | Sansing | 241/21 |
| 6,207,228 B1 | | 3/2001 | Hundt et al. | |
| 6,422,492 B1 | * | 7/2002 | Lisson et al. | 241/21 |
| 7,690,589 B2 | * | 4/2010 | Kerns | 241/16 |

* cited by examiner

*Primary Examiner* — Faye Francis
(74) *Attorney, Agent, or Firm* — Fredrikson & Byron, P.A.

(57) ABSTRACT

Apparatus and methods are provided for treating low quality forage with a treating agent and water. In certain cases, the treating agent is calcium oxide.

11 Claims, 10 Drawing Sheets

| FORAGE WITH 15% MOISTURE | | | | FORAGE WITH 17% MOISTURE | | | | FORAGE WITH 19% MOISTURE | | | |
|---|---|---|---|---|---|---|---|---|---|---|---|
| FORAGE (ton/h) | FORAGE (lb/m) | CaO (lb/m) | H₂O (gal/m) | FORAGE (ton/h) | FORAGE (lb/m) | CaO (lb/m) | H₂O (gal/m) | FORAGE (ton/h) | FORAGE (lb/m) | CaO (lb/m) | H₂O (gal/m) |
| 13 | 433 | 18.4 | 38 | 13 | 433 | 18.0 | 36 | 13 | 433 | 17.6 | 34 |
| 14 | 467 | 19.8 | 41 | 14 | 467 | 19.4 | 39 | 14 | 467 | 18.9 | 37 |
| 15 | 500 | 21.3 | 44 | 15 | 500 | 20.8 | 42 | 15 | 500 | 20.3 | 39 |
| 16 | 533 | 22.7 | 47 | 16 | 533 | 22.1 | 45 | 16 | 533 | 21.6 | 42 |
| 17 | 567 | 24.1 | 50 | 17 | 567 | 23.5 | 47 | 17 | 567 | 23.0 | 45 |
| 18 | 600 | 25.5 | 53 | 18 | 600 | 24.9 | 50 | 18 | 600 | 24.3 | 47 |
| 19 | 633 | 26.9 | 56 | 19 | 633 | 26.3 | 53 | 19 | 633 | 25.7 | 50 |
| 20 | 667 | 28.3 | 59 | 20 | 667 | 27.7 | 56 | 20 | 667 | 27.0 | 53 |
| 21 | 700 | 29.8 | 62 | 21 | 700 | 29.1 | 59 | 21 | 700 | 28.4 | 55 |
| 22 | 733 | 31.2 | 65 | 22 | 733 | 30.4 | 61 | 22 | 733 | 29.7 | 58 |
| 23 | 767 | 32.6 | 68 | 23 | 767 | 31.8 | 64 | 23 | 767 | 31.1 | 60 |
| 24 | 800 | 34.0 | 71 | 24 | 800 | 33.2 | 67 | 24 | 800 | 32.4 | 63 |
| 25 | 833 | 35.4 | 74 | 25 | 833 | 34.6 | 70 | 25 | 833 | 33.8 | 66 |

| FORAGE WITH 21% MOISTURE | | | | FORAGE WITH 21% MOISTURE | | | | FORAGE WITH 21% MOISTURE | | | |
|---|---|---|---|---|---|---|---|---|---|---|---|
| FORAGE (ton/h) | FORAGE (lb/m) | CaO (lb/m) | H₂O (gal/m) | FORAGE (ton/h) | FORAGE (lb/m) | CaO (lb/m) | H₂O (gal/m) | FORAGE (ton/h) | FORAGE (lb/m) | CaO (lb/m) | H₂O (gal/m) |
| 13 | 433 | 17.1 | 32 | 13 | 433 | 16.7 | 30 | 13 | 433 | 16.3 | 28 |
| 14 | 467 | 18.4 | 35 | 14 | 467 | 18.0 | 32 | 14 | 467 | 17.5 | 30 |
| 15 | 500 | 19.8 | 37 | 15 | 500 | 19.3 | 35 | 15 | 500 | 18.8 | 32 |
| 16 | 533 | 21.1 | 39 | 16 | 533 | 20.5 | 37 | 16 | 533 | 20.0 | 34 |
| 17 | 567 | 22.4 | 42 | 17 | 567 | 21.8 | 39 | 17 | 567 | 21.3 | 36 |
| 18 | 600 | 23.7 | 44 | 18 | 600 | 23.1 | 41 | 18 | 600 | 22.5 | 39 |
| 19 | 633 | 25.0 | 47 | 19 | 633 | 24.4 | 44 | 19 | 633 | 23.8 | 41 |
| 20 | 667 | 26.3 | 49 | 20 | 667 | 25.7 | 46 | 20 | 667 | 25.0 | 43 |
| 21 | 700 | 27.7 | 52 | 21 | 700 | 27.0 | 48 | 21 | 700 | 26.3 | 45 |
| 22 | 733 | 29.0 | 54 | 22 | 733 | 28.2 | 51 | 22 | 733 | 27.5 | 47 |
| 23 | 767 | 30.3 | 57 | 23 | 767 | 29.5 | 53 | 23 | 767 | 28.8 | 49 |
| 24 | 800 | 31.6 | 59 | 24 | 800 | 30.8 | 55 | 24 | 800 | 30.0 | 51 |
| 25 | 833 | 32.9 | 62 | 25 | 833 | 32.1 | 58 | 25 | 833 | 31.3 | 54 |

13 Moisture

| Forage (ton/h) | Forage (lb/m) | CaO (lb/m) | H₂O (gal/m) |
|---|---|---|---|
| 19 | 633 | 27.6 | 59 |
| 20 | 667 | 29.0 | 62 |
| 21 | 700 | 30.5 | 65 |
| 22 | 733 | 31.9 | 69 |
| 23 | 767 | 33.4 | 72 |
| 24 | 800 | 34.8 | 75 |
| 25 | 833 | 36.3 | 78 |
| 26 | 867 | 37.7 | 81 |
| 27 | 900 | 39.2 | 84 |
| 28 | 933 | 40.6 | 87 |
| 29 | 967 | 42.1 | 90 |
| 30 | 1000 | 43.5 | 94 |
| 31 | 1033 | 45.0 | 97 |
| 32 | 1067 | 46.4 | 100 |

15 Moisture

| Forage (ton/h) | Forage (lb/m) | CaO (lb/m) | H₂O (gal/m) |
|---|---|---|---|
| 19 | 633 | 26.9 | 56 |
| 20 | 667 | 28.3 | 59 |
| 21 | 700 | 29.8 | 62 |
| 22 | 733 | 31.2 | 65 |
| 23 | 767 | 32.6 | 68 |
| 24 | 800 | 34.0 | 71 |
| 25 | 833 | 35.4 | 74 |
| 26 | 867 | 36.8 | 77 |
| 27 | 900 | 38.3 | 80 |
| 28 | 933 | 39.7 | 83 |
| 29 | 967 | 41.1 | 86 |
| 30 | 1000 | 42.5 | 89 |
| 31 | 1033 | 43.9 | 92 |
| 32 | 1067 | 45.3 | 95 |

17 Moisture

| Forage (ton/h) | Forage (lb/m) | CaO (lb/m) | H₂O (gal/m) |
|---|---|---|---|
| 19 | 633 | 26.3 | 53 |
| 20 | 667 | 27.7 | 56 |
| 21 | 700 | 29.1 | 59 |
| 22 | 733 | 30.4 | 61 |
| 23 | 767 | 31.8 | 64 |
| 24 | 800 | 33.2 | 67 |
| 25 | 833 | 34.6 | 70 |
| 26 | 867 | 36.0 | 73 |
| 27 | 900 | 37.4 | 75 |
| 28 | 933 | 38.7 | 78 |
| 29 | 967 | 40.1 | 81 |
| 30 | 1000 | 41.5 | 84 |
| 31 | 1033 | 42.9 | 87 |
| 32 | 1067 | 44.3 | 89 |

19 Moisture

| Forage (ton/h) | Forage (lb/m) | CaO (lb/m) | H₂O (gal/m) |
|---|---|---|---|
| 19 | 633 | 25.7 | 50 |
| 20 | 667 | 27.0 | 53 |
| 21 | 700 | 28.4 | 55 |
| 22 | 733 | 29.7 | 58 |
| 23 | 767 | 31.1 | 60 |
| 24 | 800 | 32.4 | 63 |
| 25 | 833 | 33.8 | 66 |
| 26 | 867 | 35.1 | 68 |
| 27 | 900 | 36.5 | 71 |
| 28 | 933 | 37.8 | 74 |
| 29 | 967 | 39.2 | 76 |
| 30 | 1000 | 40.5 | 79 |
| 31 | 1033 | 41.9 | 82 |
| 32 | 1067 | 43.2 | 84 |

21 Moisture

| Forage (ton/h) | Forage (lb/m) | CaO (lb/m) | H₂O (gal/m) |
|---|---|---|---|
| 19 | 633 | 25.0 | 47 |
| 20 | 667 | 26.3 | 49 |
| 21 | 700 | 27.7 | 52 |
| 22 | 733 | 29.0 | 54 |
| 23 | 767 | 30.3 | 57 |
| 24 | 800 | 31.6 | 59 |
| 25 | 833 | 32.9 | 62 |
| 26 | 867 | 34.2 | 64 |
| 27 | 900 | 35.6 | 67 |
| 28 | 933 | 36.9 | 69 |
| 29 | 967 | 38.2 | 72 |
| 30 | 1000 | 39.5 | 74 |
| 31 | 1033 | 40.8 | 76 |
| 32 | 1067 | 42.1 | 79 |

23 Moisture

| Forage (ton/h) | Forage (lb/m) | CaO (lb/m) | H₂O (gal/m) |
|---|---|---|---|
| 19 | 633 | 24.4 | 44 |
| 20 | 667 | 25.7 | 46 |
| 21 | 700 | 27.0 | 48 |
| 22 | 733 | 28.2 | 51 |
| 23 | 767 | 29.5 | 53 |
| 24 | 800 | 30.8 | 55 |
| 25 | 833 | 32.1 | 58 |
| 26 | 867 | 33.4 | 60 |
| 27 | 900 | 34.7 | 62 |
| 28 | 933 | 35.9 | 65 |
| 29 | 967 | 37.2 | 67 |
| 30 | 1000 | 38.5 | 69 |
| 31 | 1033 | 39.8 | 71 |
| 32 | 1067 | 41.1 | 74 |

METHOD AND APPARATUS FOR TREATING LOW QUALITY FORAGE

CROSS REFERENCE TO RELATED APPLICATIONS

This application claims priority to U.S. Provisional Application No. 61/592,164 filed Jan. 30, 2012, and U.S. Provisional Application No. 61/719,607 filed Oct. 29, 2012, the teachings of which are incorporated herein by reference.

FIELD

This application relates generally to methods and apparatuses for treating low quality forage.

BACKGROUND

Farmers harvest plants every year to feed animals. Plants generally include fodder and forage. Fodder is the parts of the plant that is digestible and high in energy and is typically directly fed to the animals. On the other hand, forage is the parts of the plant that remain after the fodder is harvested and is not as digestible or as high in energy. In many plants, after farmers remove the grain and chaff and other fodder parts, approximately one half of the plant remains as forage. For example, farmers commonly harvest corn to feed cattle. However, once the kernels and other digestible parts are harvested, approximately one half of the dry weight of a standing corn plant is the forage which is comprised of the stalk, leaf, husk and the cob. Some forage is of better quality than others. Farmers generally do not use low quality forage to feed animals, other than as part of the roughage component of a diet, because of its low digestibility.

Some farmers have used alkali treatments on low quality forage to enhance its digestibility and nutritional value. For example, some farmers have treated low quality forage with anhydrous ammonia, sodium hydroxide, calcium hydroxide, or other strong alkalis to loosen the chemical bonds between the less digestible lignins and the more digestible components, thereby increasing the availability of the cell wall carbohydrates for digestion. This is because the natural enzymes found in the front stomach of cattle can effectively digest the treated forage which now has relaxed bonds.

Unfortunately, the costs and inefficiencies that are associated with such alkali treatments have limited their implementation. Currently, farmers simply gather low quality forage and place it inside of a feed truck. The farmers then add calcium oxide and water to the forage in the truck and mix all of the components together. The farmers then dispense the mixed components into a plastic agricultural bag and allow the components to sit for at least 7 days. After 7 days, the treated forage is ready to be fed to animals on the farm. This process is highly inefficient and is only capable of treating about 5 to 6 tons of forage per hour. As a result, farmers do not widely use this process.

Farmers have considered transporting forage off of the farm to a different site for treatment. However, forage generally has a high weight-to-value ratio, so it does not make economic sense to transport the forage off of the farm. In addition, the treatment process involves the addition of water, which results in the treated forage being even heavier than the untreated forage. Thus, even if an off-farm site could more efficiently treat the forage, the treated forage would be even more expensive to transport back to the farm for feeding animals. Thus, it would be desirable to provide apparatuses and methods for more efficient on-farm treatment of low quality forage.

BRIEF DESCRIPTION OF THE DRAWINGS

The following drawings are illustrative of particular embodiments of the invention and therefore do not limit the scope of the invention. The drawings are not to scale (unless so stated) and are intended for use in conjunction with the explanations in the following detailed description. Embodiments of the invention will hereinafter be described in conjunction with the appended drawings, wherein like numerals denote like elements.

FIG. 9 is a series of tables showing desired rates used for different forage moisture contents.

FIG. 10 is another series of tables showing other desired rates used for different forage moisture contents.

DETAILED DESCRIPTION

Figure 1:
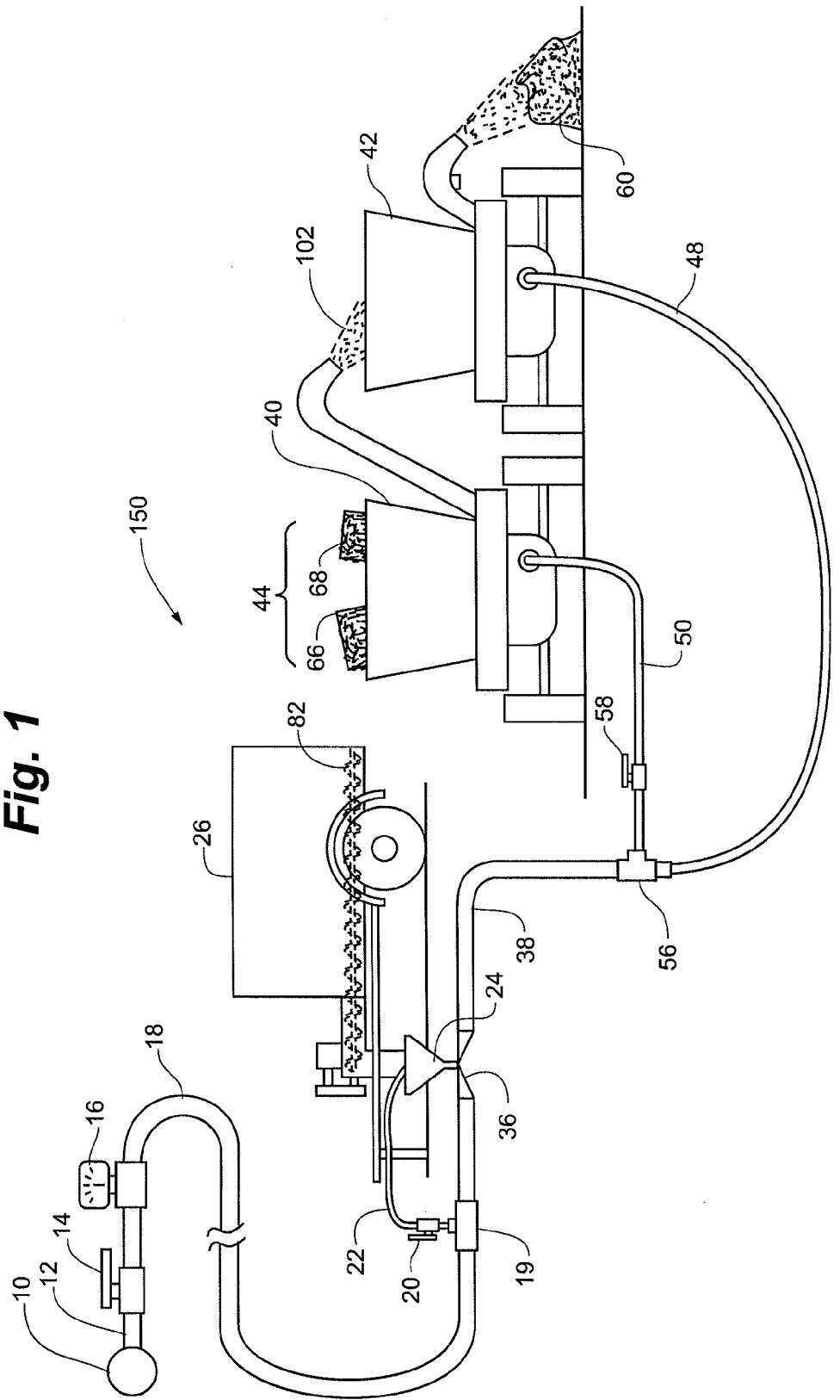
FIG. 1 is a schematic view of an embodiment of an apparatus and method to treat low quality forage.

For the purpose of promoting an understanding of the principles of the invention, reference will now be made to the embodiments illustrated in the drawing and specific language will be used to describe the same. It will, nevertheless, be understood that no limitation of the scope of the invention is thereby intended; any alterations and further modifications of the described or illustrated embodiments, and any further applications of the principles of the invention as illustrated therein, are contemplated as would normally occur to one skilled in the art to which the invention relates.

The prevent invention provides apparatuses and methods for efficiently treating low quality forage. In many cases, the apparatuses and methods can be used for on-farm treatment of low quality forage. Such on-farm treatment is advantageous because it allows for a highly efficient method for treating forage that is also economical.

The apparatuses and methods disclosed are generally used to treat low quality forage with a treating agent. The term "treating agent" refers to any kind of substance that improves the digestibility and/or nutrition of low quality forage. In many cases, the treating agent is a strong alkali such as sodium oxide or calcium oxide. In preferred cases, the treating agent is calcium oxide. The treating agent can also be calcium hydroxide. The treating agent can be a wet treating agent or a dry treating agent. In many cases, the treating agent is a dry calcium oxide.

FIG. 1 depicts a treatment apparatus 150 according to one embodiment. The treating apparatus 150 includes a water source 10 that is capable of continuously supplying water into and through the apparatus 150 at a desired rate. In many cases, the water source 10 continuously supplies water at a rate in the range of from about 25 to about 100 gallons per minute, such as from about 40 to about 100 gallons per minute, or perhaps the rate is at least about 25 gallons per minute, at least about 30 gallons per minute, at least about 35 gallons per minute, at least about 40 gallons per minute, at least about 45 gallons per minute, at least about 50 gallons per minute, at least about 55 gallons per minute, at least about 60 gallons per minute, at least about 65 gallons per minute, at least about 70 gallons per minute, at least about 75 gallons per minute, at least about 80 gallons per minute, at least about 85 gallons per minute or at least about 90 gallons per minute. In certain cases, the rate is about 50 gallons per minute. Of course, rates that are less than about 25 gallons per minute, or more than about 100 gallons per minute can also be used. Appropriate water flow rates are dependent on a number of factors, including the moisture content of the forage, the rate of forage introduced into the system, and the rate of treating agent introduced into the system and are discussed in greater detail below.

The Figures disclose different embodiments of a treatment apparatus. While each of these embodiments describes a specific series of pipes and/or tubes, skilled artisans will understand that certain of the described parts can be merged and/or split into multiple parts. For example, the apparatus 150 of FIG. 1 includes a first pipe, a second pipe and a third pipe but skilled artisans will understand that one or more of these pipes can be combined together as a single pipe or even split up into multiple pipes. Likewise, the apparatus 150 includes a number of tubes and skilled artisans will understand that any of these tubes can be provided as two or more tubes connected together rather than a single tube. This same rationale applies to all embodiments in this disclosure.

The water source 10 continuously supplies water to a first pipe 12. The first pipe 12 can have any appropriate diameter needed to supply water to the treatment apparatus 150 at a desired rate. In some cases, the first pipe 12 has a diameter of between about 1 to about 3 inches, for example about 2 inches. The first pipe 12 includes a valve 14, which is used to control the flow of the water. In many cases, the valve 14 is used to adjust the water flow rate to be within the range of from about 25 to about 100 gallons per minute.

The first pipe 12 also includes a water flow meter 16 in some embodiments. The water flow meter 16 can be connected to pipe 12 and situated near valve 14. Such positioning of the valve 14 and the water flow meter 16 simply make it easier for an operator to adjust the water flow rate. For example, when the water flow meter 16 is within reading range of the valve 14, an operator can easily adjust the water flow by actuating the valve 14 while at the same time reading the water flow meter 16.

The apparatus 150 also includes a second pipe 18 that extends from the first pipe 12. The second pipe 18 includes a fitting 19. The fitting 19 can be a T-fitting in some embodiments that splits the water flow into two directions. In the first direction, the water continues to flow through the pipe 18. In the second direction, the water flows into a water tube 22. Thus, the fitting 19 serves to divert a portion of the water in the pipe 18 into the water tube 22.

The water tube 22 extends from the fitting 19 to an agitating apparatus 24 and thus continuously directs water into the agitating apparatus 24. The water tube 22 also includes a water flow valve 20 that is positioned between the fitting 19 and the agitating apparatus 24. In certain cases, the water flow valve 20 is positioned adjacent to or is even coupled to the fitting 19. The valve 20 is used to adjust the water flow rate through the water tube 22. In some cases, the water flow rate through the water tube 22 is in a range of from about ½ to about 5 gallons per minute. A water flow meter (not shown) can also optionally be provided on the water tube 22, so that the water flow rate through the tube 22 can more easily be monitored.

Of course, in other embodiments, not illustrated, a second source of water could instead supply water to the agitating apparatus 24, which would result in the fitting 19 being unnecessary. In this embodiment, one might need to adjust the water flow from the first water source 10 into the pipes 12, 18 to compensate for the additional water that would be introduced from the second water source. However, in preferred embodiments, the single water source 10 arrangement shown in the Figures is provided, as it provides for a more simple design that is easier to install on existing farms.

With continued reference to FIG. 1, a treating agent source 26 houses a treating agent 76 and continuously supplies the treating agent 76 into the agitating apparatus 24 in addition to the water stream provided by the water tube 22. As such, the agitating apparatus 24 continuously receives both water from the tube 22 and the treating agent 76 from the source 26. Any known source capable of holding and dispensing materials can be used as the treating agent source 26. In certain cases, the treating agent 76 is a strong alkali such as calcium oxide. The treating agent 76 is supplied to the agitating apparatus 24 at a desired rate. The desired rate is dependent on a number of facts and is discussed in greater detail below.

The treating agent 76 can be provided as a dry product or a liquid product. A dry product can advantageous over a wet product for a number of reasons. First, a dry product is much cheaper for a farmer to buy as it is easier to transport and has lower shipping costs than a liquid product, which has water included. A dry product is also easier to handle on the farm because it is less bulky and much lighter than a wet product. On the other hand, a wet product is advantageous in that the treating agent 76 is already provided as a premixed and uniform solution that can be used to treat forage. In cases where a wet product is used, the wet product can be calcium hydroxide.

In certain cases, the treating agent 76 is a dry product. In one case, the dry product is dry calcium oxide. Dry calcium oxide is available in a variety of physical forms, including powdered or pulverized (particle sizes typically measured in microns) forms, ground or granulated (particle sizes up to about ¼ inch) forms, and crushed or pebble forms (particle sizes ranging from about ¼ inch to about 2½ inches). Ground or granulated calcium oxide is commercially available from many sources, for example, "Gran Standard Quicklime" can be obtained from the Mississippi Lime Company, St. Louis, Mo.

Again, both water from the water tube 22 and the treating agent 76 are continuously supplied to the agitating apparatus 24. The treating agent 76 and the water are mixed together in the agitating apparatus 24 so that the treating agent 76 becomes suspended in the water. The agitating apparatus 24 can be any type of apparatus that agitates the treating agent 76 and water so that the treating agent 76 becomes suspended in the water. In certain embodiments, the agitating apparatus 24 is a funnel. The water flow rate is adjusted in order to ensure that the treating agent 76 is appropriately suspended in the water and remains suspended in the water as it flows through the funnel 24 and moves through the remainder of the apparatus 150.

In cases where a treating agent 76 is used, it can be challenging to ensure that the dry treating agent 76 remains suspended in the water as it moves through the entire apparatus 150. Powdered or pulverized dry product forms can sometimes be cohesive and thus do not flow well due to their small particle size or irregular surface characteristics. Ground, granulated or crushed product forms often exhibit good flow characteristics, but only when flowing freely. Once granulated or crushed product forms are static, they tend to clog when forced through a constriction.

Figure 2:
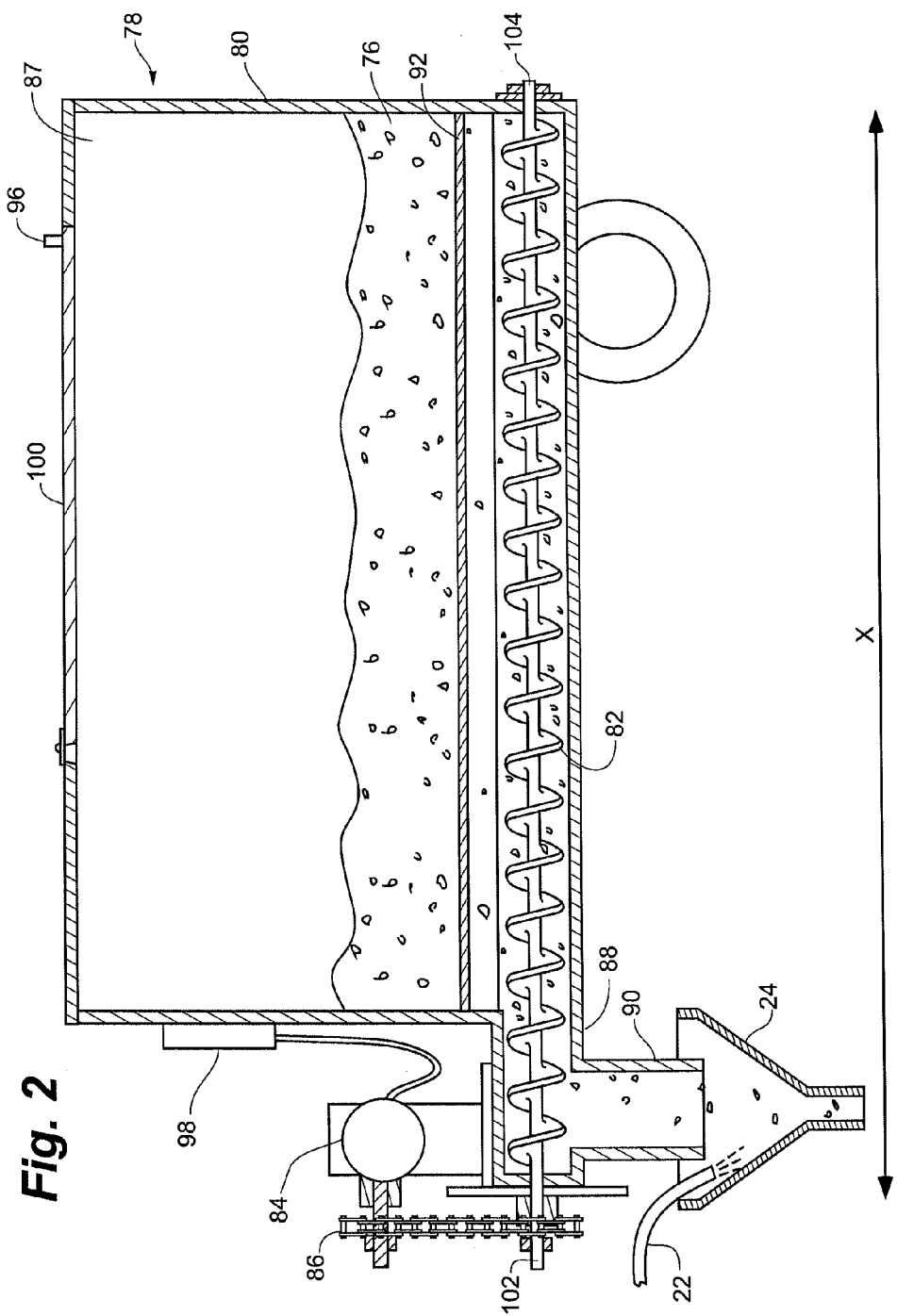
FIG. 2 is a cut away cross sectional side view of an embodiment of a treating agent source.
Figure 3:
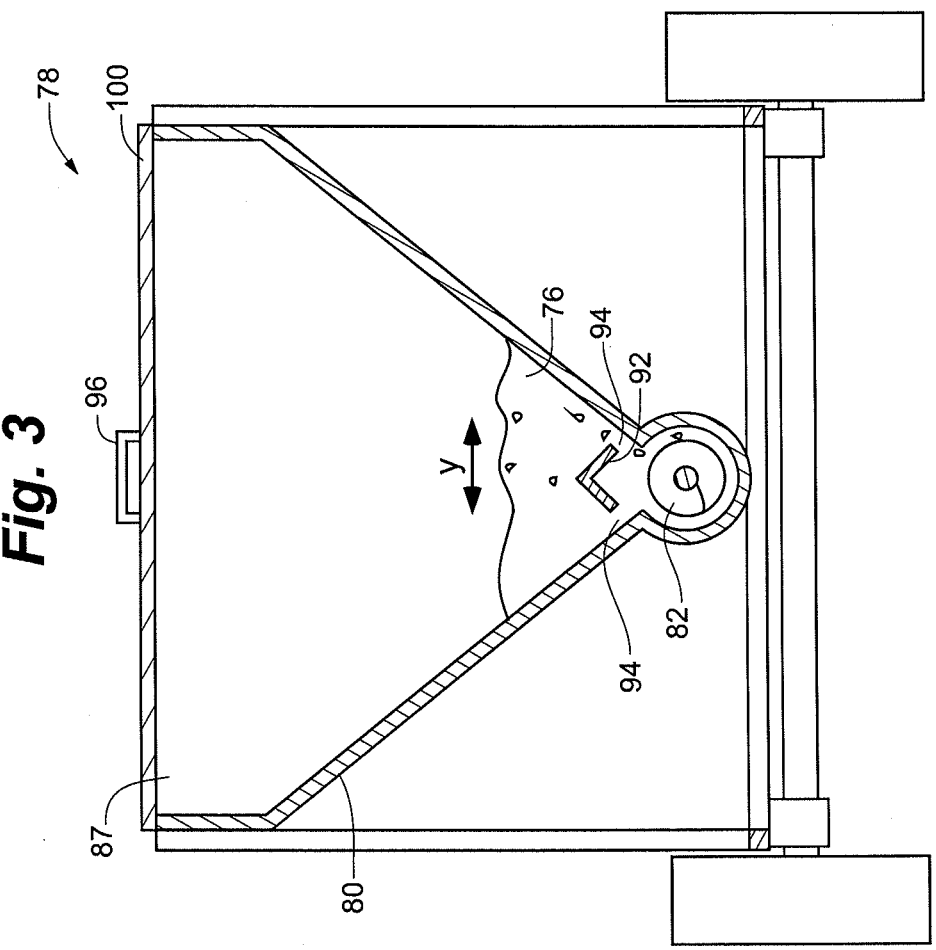
FIG. 3 is a cut away cross sectional end view of the treating agent source of FIG. 2.

In order to ensure that the treating agent 76 remains suspended in the water as it moves through all parts of the apparatus 150, in some embodiments, a special treating agent processing device can be used as the treating agent source 26. FIGS. 2 and 3 illustrate a processing device 26 according to one embodiment. The processing device 26 generally includes a holding tank 80 that houses the treating agent 76. The device 26 also includes a lid 100 that covers the holding tank 80 and a handle 96 for opening and closing the lid 100.

In certain embodiments, the processing device 26 is in the form of a trailer and includes one or more wheels. Such a trailer allows for the treating agent 26 to be easily transported from one area of the farm to another. For example, the treating agent 26 can be stored at one site on a farm. A farmer can add treating agent to the holding tank 80 at the storage site and then transport the trailer (and thus the treating agent 26) to another site where forage is to be treated. Of course, skilled artisans will understand that the processing device 26 can instead be a permanent structure and would not be in the form of a trailer or have wheels.

The holding tank 80 in the processing device 26 has one or more downwardly sloping or curving side walls that help to direct the treating agent 76 towards a bottom or floor of the tank. The holding tank 80 can be any type of compartment or storage structure. In some cases, the holding tank 80 is configured as a "V" shape or "U" shape. FIG. 3 shows the holding tank 80 configured as a "V" shape. Of course, other tank configurations can be used to direct the treating agent 76 downwardly.

The holding tank 80 also includes a propelling mechanism 82 that propels or drives treating agent 76 in a desired direction. The propelling mechanism 82 can be an auger, conveyor, pneumatic or even gravity that can move the treating agent. In FIGS. 2 and 3, the propelling mechanism 82 is shown as an auger, although this is not required.

The propelling mechanism 82 is preferably positioned at or adjacent to a bottom or floor of the holding tank 80. The propelling mechanism 82 can have a variety of sizes and configurations. The propelling mechanism 82 can run along a majority of or even along all of the length of the holding tank 80.

In FIGS. 2 and 3, the propelling mechanism is an auger 82 having a first end 102 and a second end 104, wherein each the first end 102 and the second end 104 is coupled to a side of the holding tank 80. The auger ends 102, 104 can be coupled to the holding tank 80 using any desired configuration. The auger 82 generally includes a helical coil that turns in a direction. The helical coil is configured so that as the coil turns, it drives the treating agent 76 forward or towards the first end 102. The auger 82 can be driven by an external device. In the illustrated embodiment, the auger 82 is driven (i.e. turned) by a motor 84 and drive chain 86. The motor 84 can be operatively coupled to the drive chain 86 and the drive chain 86 can be coupled to the first end 102 of the auger. The drive chain 86 turns the auger 82 in a direction so that the helical coil propels the treating agent 76 towards the first end 102.

The holding tank 80 further includes an outlet 90 in the floor. The outlet 90 can extend downward and outward from the tank 80. The outlet 90 is also preferably positioned so that it is directly above the agitating apparatus 24. Thus, as the propelling mechanism 82 propels the treating agent 76 at the bottom of the holding tank towards and over the outlet 90, it becomes free to fall down the outlet 90 and into the agitating apparatus 24. In FIGS. 2 and 3, the outlet 90 is preferably positioned so that it is nearer the first end 102 than the second end 104 of the auger. Since the auger turns so that it drives the treating agent 76 towards the first end 102, it is desirable that the outlet 90 be positioned nearer the first end 102.

Referring to FIG. 3, the holding tank 80 can further include a bracket 92. The bracket 92 can help to regulate the amount of treating agent 76 that compacts down on the propelling mechanism 82. The bracket 92 is preferably installed directly above the propelling mechanism 82. The bracket 92 can also have a size and shape that generally matches or surrounds the propelling mechanism 82. In some embodiments, the propelling mechanism 82 has a length x and the bracket 92 can also have the same length x or a length that is at least ½ or perhaps ⅔ or perhaps ¾ the length x. FIG. 2 shows the bracket 92 as running at least ¾ the length. Also, if the propelling mechanism has a diameter y or width w, the bracket 92 can also have a total width that is the same or that is at least ½ or perhaps ⅔ or perhaps ¾ the diameter y or width w. FIG. 3 shows the bracket as having generally the same width as the diameter of the auger 82.

The bracket 92 also has a shape that helps to prevent the treating agent 76 from accumulating and compacting on top of the propelling mechanism 82. In FIG. 3, the bracket 92 has an inverted "V" shape. Such an inverted "V" shape helps distribute the treating agent 76 towards the sides of the tank 80 rather than towards a top of the propelling mechanism 82. The inverted V-bracket 92 runs the length of the holding tank 80 and it is supported at either end of the holding tank 80.

The bracket 92 is positioned within the holding tank so that two slits or gaps 94 are present along longitudinal side edges of the bracket 92. In other words, the gaps 94 are between each longitudinal side edge of the bracket and a downwardly sloping or curving sidewall of the tank 80. The gaps 94 are sized and shaped to permit the treating agent 76 to pass through the gaps 94. Such gaps 94 also help to distribute the treating agent towards the sides of the tank 80 (and towards the sides of the propelling mechanism 82) rather than directly on top of the propelling mechanism 82. The gaps 94 can also be sized to accommodate a particular type and size of treating agent 76. For example, if the treating agent 76 is granulated calcium oxide, which can have a particle size of up to about ⅜ of an inch, the gap 94 can have a size of about ½ to 1.5 inches, such as 1 inch.

In cases where the propelling mechanism 82 is an auger, the bracket and gap configurations help to distribute the treating agent 76 away from the top of the auger 82. Without the bracket 92 and/or gaps 94, the entire weight of the treating agent 76 in the tank would compact down on the auger 82 and possibly prevent the auger 82 from turning. With the bracket 92 and/or gaps installed, the auger 82 is permitted to turn relatively freely, while at the same time, the treating agent 76 passes in a controlled manner to the auger 82 so that the auger 82 can effectively drive the treating agent from the holding tank towards and out of the outlet 90. Of course, other brackets and/or gap configurations can be used as long as it helps the treating agent 76 to pass in a controlled manner to the auger 82. Likewise, structures other than a bracket, such as an air lock or a slide gate, can be used to help prevent the treating agent 76 from accumulating and compacting on top of the propelling mechanism 82.

In certain embodiments, such as shown in FIG. 2, the holding tank 80 includes a main compartment 87 and a neck region 88. The neck region 88 extends generally horizontally from a portion of the main compartment 87. In this case, the neck region extends forwardly and horizontally from a bottom portion of the main compartment 87. The main compartment 87 is also the portion of the holding tank that has one or more downwardly sloping or curving side walls that help to direct the treating agent 76 towards a bottom. The neck region 88 is not required to be sloped or curved. In FIG. 2, the auger 82 extends along a bottom portion of the main compartment 87 and into the neck region 88. Here, the first end 102 is coupled to a side of the neck region 88 and the second end 104 is coupled to a side of the main compartment 87. In other words, as the coil turns, it drives the treating agent from the main compartment 87 into the neck region 88.

Further, in the embodiment of FIG. 2, the outlet 90 extends from the neck region 88 downward and is positioned so that it is directly beneath the neck region 88 and above the agitating apparatus 24. Here, as the auger 82 rotates, it propels the treating agent 76 at the bottom of the main compartment 87 towards the neck region 88. As the treating agent 76 moves into the neck region 88, it becomes free to fall down the outlet 90 and into the agitating apparatus 24. Of course, skilled artisans will understand that the holding tank 80 need not be configured as a main compartment 87 and neck region 88 and that the neck region 88 can be omitted in other embodiments.

The processing device 26 also includes a controller 98 that controls the speed of the motor 84. The controller 98 can be mounted anywhere about the device 26. Likewise, any suitable controller 98, such as an amperage controller, that can regulate the speed of the motor 84 can be used. The controller 98 controls the motor 84 speed, which in turn controls the drive chain 86 and auger 82 speeds, Thus, the controller 98 regulates the rate at which the treating agent 76 is delivered out of the tank 80 through the outlet 90. In certain embodiments, the treating agent 76 is continuously delivered through the outlet 90 at a rate of from about 15 to about 60 pounds per minute, or perhaps from about 20 to about 50 pounds per minute or even perhaps from about 25 to about 50 pounds or from about 25 to about 45 pounds per minute. In other embodiments, the treating agent 76 is continuously delivered through the outlet 90 at a rate of at least about 15 pounds per minute, at least about 20 pounds per minute, at least about 25 pounds per minute, at least about 30 pounds per minute, at least about 35 pounds per minute, at least about 40 pounds per minute, or at least about 45 pounds per minute.

It is desirable to be able to control of the rate of continuous delivery of the treating agent 76 into the agitating apparatus 24 as this helps to achieve a desired mix of water, treating agent 76 and raw forage 44. It is also desirable to achieve a substantially uniform rate of treating agent 76 delivery, as this can be helpful in obtaining a substantially uniform distribution of both water and treating agent 76 throughout the forage 44. As can be appreciated, such a substantially uniform and continuous distribution of water and treating agent 76 with the raw forage 44 can lead to an enhanced treated product.

Still referring to FIG. 2, the treating agent 76 is continuously delivered to the agitating apparatus 24 through the outlet 90 of tank 80. At the same time, a water stream, provided by water tube 22 is continuously introduced into the agitating apparatus 24. The water stream helps to incorporate the treating agent 76 into the flow of water. In certain cases, the agitating apparatus 24 is a funnel and the water stream provided by water tube 22 causes a swirling action within the funnel to help rinse the treating agent 76 from the sides of the funnel. The shape of the funnel and the water swirling action work together to create a treating agent 76 and water mixture. In so doing, some of the treating agent 76 dissolves into the water, while the agitation of the swirling helps the remaining treating agent 76 initiate a suspension in the water. The water flow rate through the water tube 22 need only be high enough to sufficiently wash the sides of the funnel and ensure that the treating agent does not build up inside of the funnel. In certain embodiments, water flow rate required to accomplish this is approximately 1 to 3 percent of the overall water flow rate, for example, between ½ to about 5 gallons per minute, as measured by the water flow meter 16.

Referring back to FIG. 1, the lower portion of agitating apparatus 24 is connected to a fluid eductor 36. The treating agent 76 and water suspension that exits the lower portion of the agitating apparatus 24 then enters into the flow of water that is passing from the second pipe 18 to the third pipe 38 through a fluid eductor 36. While the agitating apparatus 24 and the water provided by water tube 22 help to initiate the mixing and suspension of the treating agent 76 in the water, additional agitation occurs once the water flow from the agitating apparatus 24 joins the main water line at the eductor 36. This additional agitation also helps to suspend the treating agent 76 in the water. The treating agent 76 and water suspension (hereinafter "suspension 52") then moves onward through the third pipe 38. In some embodiments, the suspension has a weight percent of about 5% to about 7% of treating agent (e.g., calcium oxide) to water.

The suspension 52 is then continuously piped to two mixing machines or grinding machines 40 and 42. A farmer feeds raw forage 44 from any forage source into the first grinding machine 40. The raw forage 44 can be provided as a full round bale 66, a square bale 68 or other suitable configuration. The first grinding machine 40 operates to break down the particle size of the raw forage 44 into reduced particle forage 46. The term "reduced particle forage" refers to any forage that has previously had its particle size reduced by grinding. Likewise, the term "raw forage" refers to any forage that has not had its particle size reduced by grinding.

The machine 40 then feeds the reduced particle forage 46 into the second grinding machine 42. In certain embodiments, the raw forage 44 is introduced into the first grinding machine 40 at a rate of from about 10 to about 40 tons per hour or from about 15 to about 35 tons per hour or perhaps at a rate of at least about 10 tons per hour, at least about 15 tons per hour, at least about 20 tons per hour, at least about 25 tons per hour, at least about 30 tons per hour, at least about 35 tons per hour or at least about 40 tons per hour.

Applicant has found it to be beneficial to introduce some of the suspension 52 to the raw forage 44 inside of the grinding machine 40 because grinding dry raw forage 44 in the absence of added water can result in a relatively large loss of the dry raw forage 44 due to wind and other factors. On the other hand, the addition of too much suspension 52 can interfere with the operation of the grinding machine 40. In other words, too much suspension 52 can cause the grinding machine 40 to become clogged up and thus hinder the machine's ability to dispense the reduced particle size forage 46 into grinding machine 42. The reduced particle size forage 46, which has now been mixed with the suspension 52 is then fed into the second grinding machine 42.

Although both the first and second grinding machines 40, 42 are depicted as similar machines, any appropriately sized grinding machine that permits a water solution to be introduced can be used. In other embodiments (as will be described below), a single grinding machine is used rather than two machines. In each of these embodiments, the grinding machine(s) can be any grinding machine known in the art, such as a tub grinding machine or a horizontal grinding machine. In other embodiments, another mixing machine other than a grinding machine can be used, such as a mixer auger or a vertical or horizontal mixer. An apparatus that is capable of mixing the suspension and forage material can be used.

In certain embodiments, the mixing or grinding machine(s) includes a grinding machine sold under the brand name "Roto-Grind" (sold by Burrows Enterprises, Inc.). Roto-Grind machines are particularly helpful relative to many other machines, as they are designed to permit a liquid solution to be introduced into their grinding chambers. Of course, other machines that can similarly have a liquid solution introduced into their grinding or mixing chambers can be used. In other embodiments, the machine(s) includes a horizontal grinding machine sold by Morbark, Inc. In yet other embodiments, the machine(s) includes a horizontal grinding machine sold under the brand name "Rotochopper" (sold by Rotochopper Inc.). Other suitable machines include machines sold under the brand names "Mighty Giant" (sold by Jones Manufacturing Company) and "Haybuster" (sold by Duratech Industries). Skilled artisans will understand that any suitable mixing or grinding machine known in the art that is capable of mixing fluid solution and forage can be used.

There are several other characteristics to consider when selecting a machine to grind the raw forage 44. Particle size of the forage can be described with reference to a screen size through which the forage will pass. Reducing the particle size of the raw forage 44 to a size that would fit through a one inch screen produces an enhanced final product when compared to forage sized to fit through a three inch screen. A grinding machine that is capable of reducing the particle size of a full bale of forage (either a round bale 66 or a square bale 68) so that it can pass through a one inch screen is desirable, though not necessary. Additionally, selecting a grinding machine that is capable of consistent results for a range of dry, moist and wet forage is also desirable. In the embodiment depicted in FIG. 1, the first grinding machine 40 is being used to initiate both the particle size breakdown, and the introduction of some of the suspension 52 to the raw forage 44. The second grinding machine 42 is being used to further reduce particle size of the reduced particle size forage 102 and to incorporate additional suspension 52 into the forage 102.

The suspension 52 continuously flows from the agitating apparatus 24 to both of the grinding machines 40, 42. After the suspension 52 exits the agitating apparatus 24, it flows into a third pipe 38. The third pipe 38 includes a fitting 56 that causes the suspension 52 to flow into two directions. In a first direction, the suspension 52 flows to the first grinding machine 40. In a second direction, the suspension 52 flows to the second grinding machine 42. In FIG. 1, the fitting 56 is a T-fitting that splits the flow into a first supply tube 50 and a second supply tube 48. Of course, the fitting 56 can instead be a Y fitting in some cases. The first supply tube 50 extends from the fitting 56 to the first grinding machine 40. The second supply tube 48 extends from the fitting 56 to the second grinding machine 42.

The first supply tube 50 can include an optional water valve 58. The water valve 58 regulates the flow of the suspension 52 through the first supply tube 50 into the first grinding machine 40. The water valve 58 also indirectly regulates the flow of the suspension 52 through the second supply tube 48 into the second grinding machine 42, because the availability of the suspension 52 to flow through the second supply tube 48 is impacted by the flow rate of the suspension 52 that is permitted to flow through supply tube 50.

A farmer can use the water valve 58 to regulate the flow of the suspension 52 to each of the grinding machines 40, 42. Applicant has discovered that certain flow rates work particularly well. Thus, in certain embodiments, the water valve 58 can be set so that between 25% to 45% of the suspension 52 that flows to the fitting 56 flows through the first supply tube 50 and so that the remaining 55% to 75% of the suspension 52 flows through the second supply tube 48. In one embodiment, the water valve 58 is set so that about 35% of the suspension 52 that flows to the fitting 56 flows through the first supply tube 50, whereas the remaining 65% flows through the second supply tube 48.

In certain embodiments, the water valve is set so that at least 25% of the suspension 52 flows through the first supply tube 50. Such a setting can be desirable to ensure smooth operation of the overall apparatus 150. If the flow of the suspension 52 through valve 58 is overly restricted, the suspension 52 may back up through eductor 36 and up and out of funnel 24.

The percentages of the suspension 52 diversion stated herein can be adjusted depending on the sizes and shapes of the pipes 12, 18, 38 and tubes 22, 48, 50 and also based on the overall water flow rate that is set by the first water valve 14. The diversion percentages stated herein are for a treatment apparatus 150 that has an overall water flow rate of in the range of from about 25 to about 100 gallons per minute.

In operation, a farmer continuously introduces raw forage 44 from a forage source into the grinding machine 40. The grinding machine 40 continuously grinds the raw forage 44, mixes it with some of the suspension 52 and then dispenses it into the second grinding machine 42 as reduced particle forage 102. The second grinding machine 42 further continuously grinds the reduced particle forage 102, mixes it with additional suspension 52 and then dispenses it as final treated forage 60.

Figure 4:
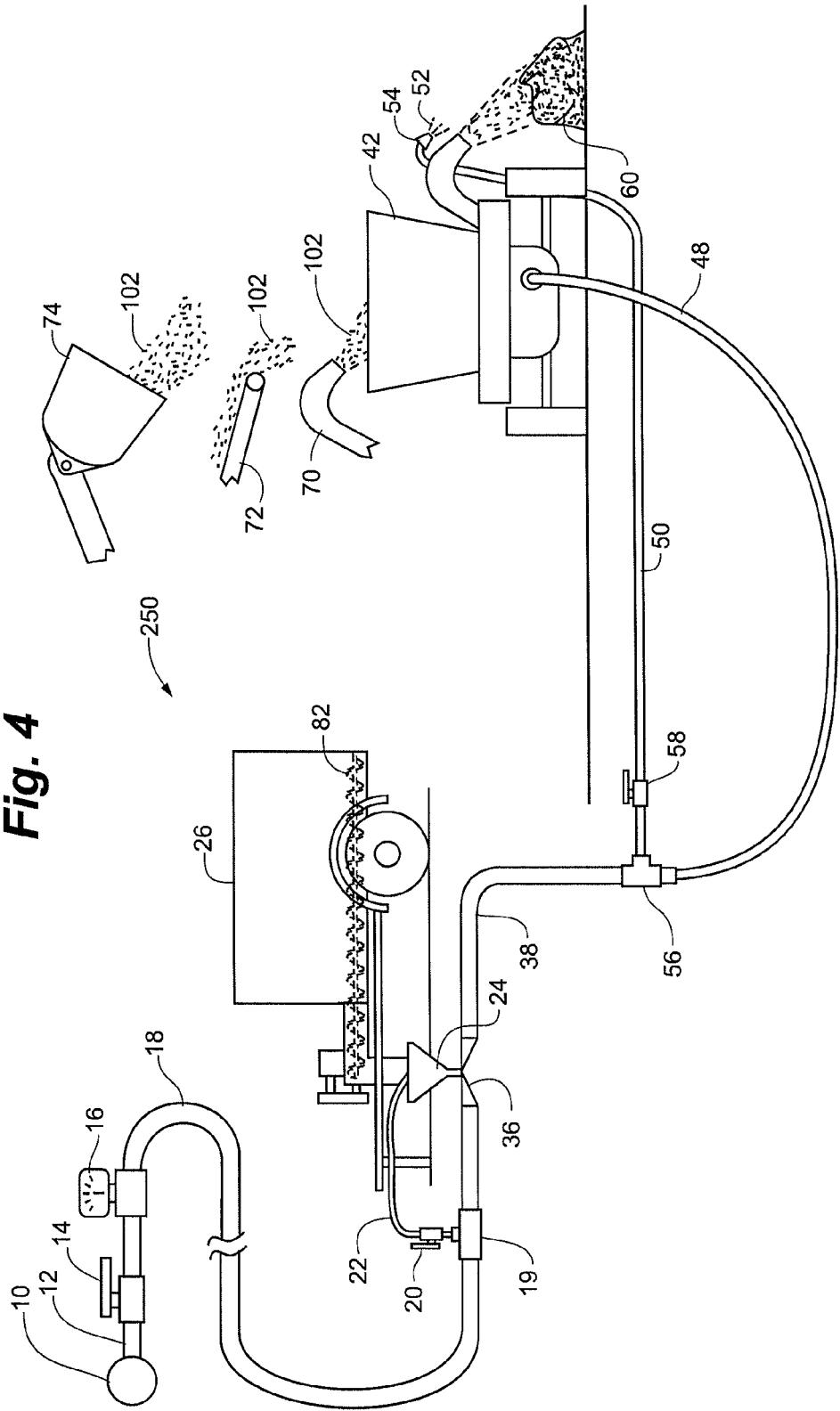
FIG. 4 is a schematic view of another embodiment of an apparatus and method to treat low quality forage.

FIG. 4 illustrates a treating apparatus 250 according to another embodiment. In this embodiment, the treating apparatus 250 employs the use of only one grinding machine 42. The treating apparatus 250 is similar to the treating apparatus 150 up through the fitting 56. As such, the structural elements described above with reference to FIG. 1 through the fitting 56 are herein incorporated by reference. The fitting 56 in FIG. 4 again splits the flow of the suspension 52 into two directions. In a first direction, the suspension 52 continuously flows to a single grinding machine 42. In a second direction, the suspension 52 flows to an external site. As shown, the fitting 56 is a T-fitting (or perhaps a Y fitting) that splits the flow into a first supply tube 50 and a second supply tube 48. The first supply tube 50 extends from the fitting 56 to the external site. The second supply tube 48 extends from the fitting 56 to the single grinding machine 42.

The first supply tube 50 includes an optional water valve 58. The water valve 50 regulates the flow of the suspension through the first supply tube 50 to the external site. The first supply tube 50 is also connected to nozzle 54, which permits the spraying of the suspension 52 from nozzle 54. In a similar manner to that described for the embodiment shown in FIG. 1, the water valve 58 can help to control the flow rates of the suspension 52 through supply tubes 48 and 50. Thus, in certain embodiments, the water valve 58 can be set so that between 25% to 45% of the suspension 52 that flows to the fitting 56 flows through the first supply tube 50 and so that the remaining 55% to 75% of the suspension 52 flows through the second supply tube 48. In one embodiment, the water valve 58 is set so that about 35% of the suspension 52 that flows to the fitting 56 flows through the first supply tube 50, whereas the remaining 65% flows through the second supply tube 48.

The embodiment depicted in FIG. 4 is optimal for treating forage when either: (a) only one grinding machine is available, or (b) when more than one grinding machines are available, however, only one machine is capable of having a water solution introduced into its grinding tub. When only one grinding machine is available, the raw forage 44 is first ground before it is used in the treating apparatus 250. The raw forage 44 can be ground using any grinding machine or mechanism known in the art. In some cases, the grinding machine 42 can be used to grind the raw forage 44 before the grinding machine 42 is set up to be part of the treating apparatus 250. In any event, the raw forage 44 typically is ground on a dry basis. That is, no suspension is introduced during the grinding. Thus, raw forage 44 is ground into reduced particle size forage 102 before being used in the treating apparatus 250.

In operation, a farmer introduces reduced particle forage 102 into the grinding machine 42. The farmer can introduce the reduced particle forage 102 using an output spout 70 of another grinding machine, a conveyor belt 72, a loading bucket 74 or any other suitable method. The grinding machine 42 grinds the reduced particle forage 102, mixes it with some of the suspension 52 and then dispenses through a spout to an external site. In this embodiment, the grinding machine 42 is being used to complete the particle size reduction and to introduce the suspension 52 to the reduced particle forage 102. The second supply tube 48 provides a percentage of the suspension 52 to the nozzle 54. The nozzle 54 sprays the suspension 52 onto forage coming out of the spout of the grinding machine. Thus, additional suspension 52 is added to the forage and results in final treated forage 60 being deposited at the external site.

Figure 5:
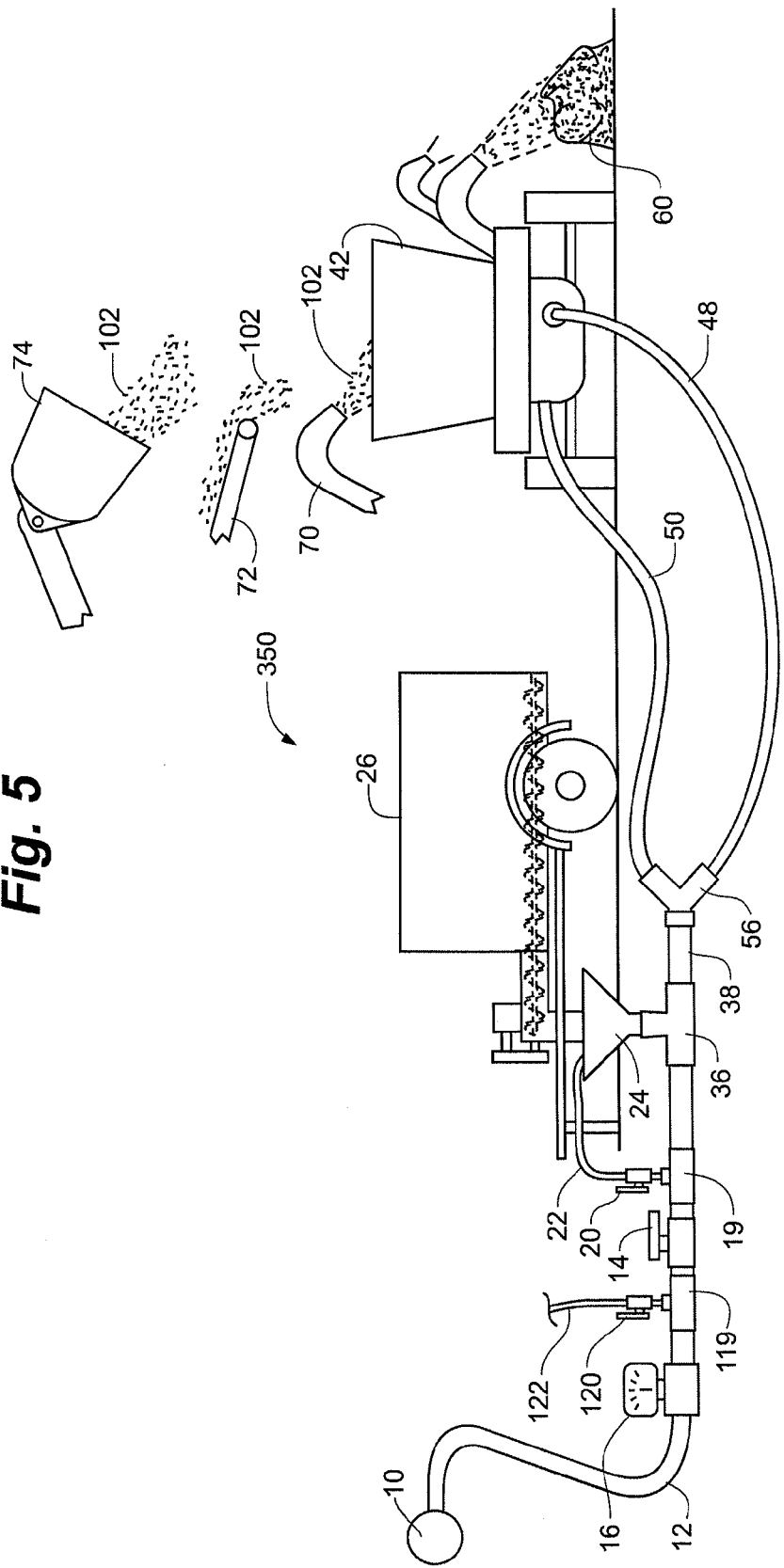
FIG. 5 is a schematic view of another embodiment of an apparatus and method to treat low quality forage.

FIG. 5 illustrates a treating apparatus 350 according to another embodiment. In this embodiment, the treating apparatus 350 also employs the use of only one grinding machine 42. The treating apparatus 350 includes a water source 10, which continuously supplies water to a first pipe 12. The first pipe 12 also can have any appropriate diameter needed to supply water to the treatment apparatus 350 at a desired rate. For example, the first pipe 12 has a diameter of at least about 2 inches in some cases. In this embodiment, the first pipe 12 includes a water flow meter 16. Preferably, the water source 10 provides water to the first pipe at a continuous flow rate in the range of from about 25 to about 100 gallons per minute, such as from about 40 to about 100 gallons per minute, or perhaps the rate is at least about 25 gallons per minute, at least about 30 gallons per minute, at least about 35 gallons per minute, at least about 40 gallons per minute, at least about 45 gallons per minute, at least about 50 gallons per minute, at least about 55 gallons per minute, at least about 60 gallons per minute, at least about 65 gallons per minute, at least about 70 gallons per minute, at least about 75 gallons per minute, at least about 80 gallons per minute, at least about 85 gallons per minute or at least about 90 gallons per minute.

A second pipe 18 extends from the first pipe 12 and includes a main valve 14 that is used to control the flow of water. The second pipe 18 also includes a first fitting 19 and an optional second fitting 119. The first fitting 19 serves to divert a portion of the water in the pipe 18 into a water tube 22 and the optional second fitting 119 serves to divert a portion of the water in the pipe 18 into an optional water tube 122. The optional water tube 122 is used to supply water to be used in any desired convenient manner. For example, the water can be used for cleaning, washing, cooling or even drinking. As shown, the first fitting 19 is positioned downstream of the main valve 14 and includes a valve 20, which is used to adjust the water flow rate through the water tube 22. Typically, the water flow rate through the water tube 22 is between about ½ to about 5 gallons per minute. The optional second fitting 119 is positioned upstream of the main valve 14 and includes a valve 120, which is used to adjust the water flow rate through the water tube 122.

The apparatus further includes an eductor 36 that extends from the second pipe 18. The eductor 36 is connected to an agitating apparatus 24, which receives treating agent 76 and water from the water tube 22. The treating agent 76 can be dispensed into the agitating apparatus 24 using any known mechanism. In certain embodiments, the treating agent 76 can be processed and dispensed using a processing device 26 as described in FIGS. 2 and 3. The eductor 36 is also connected to a third pipe 38. As discussed above, the agitating apparatus 24 and educator 36 work together to suspend the treating agent 76 in the water. The suspension then moves into the third pipe 38.

The third pipe 38 includes a fitting 56 (such as a Y-shaped or T-shaped fitting) that connects to a first tube 48 and a second tube 50. The first tube 48 connects to one side of the grinding machine 42 and the second tube 50 connects to another side (perhaps an opposite side) of the grinding machine 42. Applicant has discovered that a Y shaped fitting is particularly beneficial in evenly splitting the suspension into two directions.

In the embodiment shown in FIG. 5, neither of the tubes 48, 50 include a water valve, although this could be provided if desired. By omitting a valve, roughly 50% of the suspension flows through tube 48 and roughly the other 50% flows through the tube 50. Again, each of the tubes 48, 50 are connected to sides of a grinding machine 42. As such, the grinding machine 42 has two inputs receiving the suspension. A farmer continuously introduces reduced particle forage 102 into the grinding machine 42 at a desired rate, perhaps at a rate of at least about 10 tons per hour, at least about 20 tons per hour, at least about 30 tons per hour or even between about 10 to about 30 tons per hour. The suspension being inputted from sides of the apparatus 42 thoroughly mixes with the reduced particle forage 102 to produce final treated forage 60, which is deposited at an external site.

Figure 7:
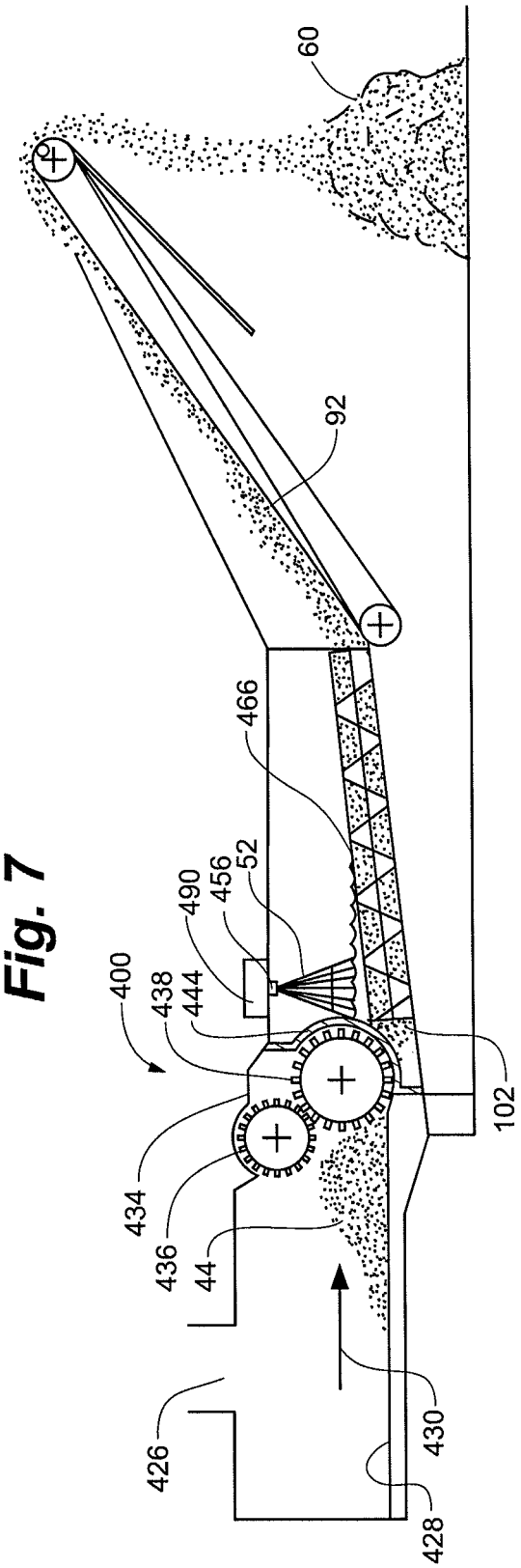
FIG. 7 is a schematic view of another embodiment of an apparatus and method to treat low quality forage.

FIG. 7 illustrates a horizontal grinding machine 400 according to an embodiment of the invention. The horizontal grinding machine 400 generally includes a feed hopper 426, a conveyor chain 428 and a mill 434. The mill 434 can include a yoke 436 and a hammer mill 438. A farmer continuously feeds raw forage 44 into the feed hopper 426. The rate the raw forage is fed into the hopper 426 depends on the forage moisture and on the desired particle size to grind. In some embodiments, the rate is a rate of from about 10 to about 40 tons per hour or from about 15 to about 35 tons per hour or perhaps at a rate of at least about 10 tons per hour, at least about 15 tons per hour, at least about 20 tons per hour, at least about 25 tons per hour, at least about 30 tons per hour, at least about 35 tons per hour or at least about 40 tons per hour.

The conveyor chain 428 continuously moves the raw particle forage 44 through the mill 434. The yoke 436 helps feed raw particle forage 44 into contact with the hammer mill 438, which grinds it up to produce reduced particle forage 102. The machine 400 can also include a sieve or screen 444 that ensures that only reduced particle forage 102 moves through.

A suspension is continuously supplied to an input 490 on the machine 400. Skilled artisans will understand that any apparatuses or devices capable of providing a suspension 52 to an input 490 on the horizontal grinding machine 400 can be used. In some cases, the suspension 52 is inputted to a nozzle 456, which continuously sprays the suspension 52 onto the reduced particle forage 102. In other embodiments, a device other than a nozzle is used to disperse the suspension onto the reduced particle forage 102. In some cases, the suspension 52 is dispersed onto a reduced particle forage at a rate that is dependent on the rate of the flow of the forage through the screen 444.

Both the suspension 52 and reduced particle forage 102 are mixed together by an auger 466 to produce treated forage 60. The auger 466 also continuously propels the treated forage 60 towards a stacking conveyor 492. The stacking conveyor 492 continuously discharges the treated forage 60 to an external site. In some embodiments, the horizontal grinding machine is a grinding machine disclosed in U.S. Pat. No. 6,321,804, hereby incorporated by reference.

Figure 6:
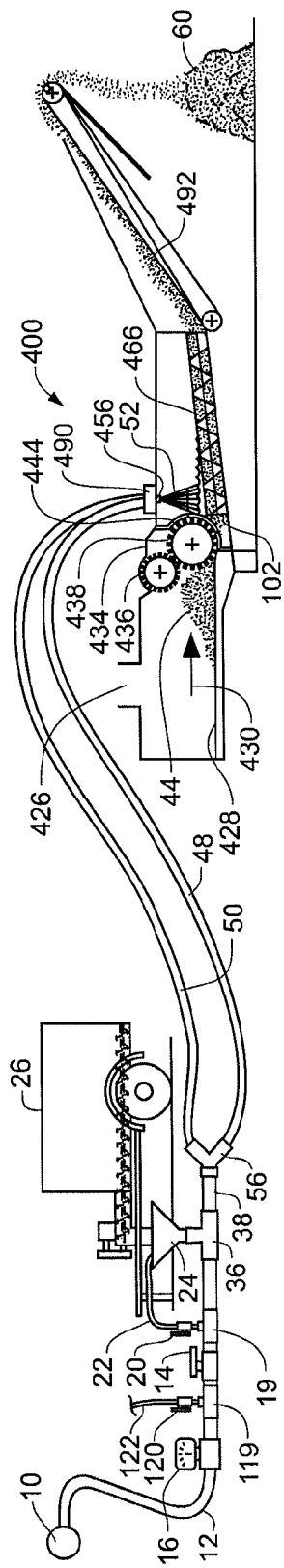
FIG. 6 is a schematic view of another embodiment of an apparatus and method to treat low quality forage.

FIG. 6 illustrates a treating apparatus 450 according to yet another embodiment. The treating apparatus 450 is similar to the apparatus 350 of FIG. 5 except that it includes the horizontal grinding machine 400 described in FIG. 7 rather than a tub grinding machine. As such, the structural elements described above with reference to FIG. 5 through the tubes 48, 50 are herein incorporated by reference. In this embodiment, the hoses 48, 50 are connected to an input 490 on the machine 400 and continuously supply suspension 52 to the machine input 490. Of course, skilled artisans will understand that a single hose (48 or 50) rather than both hoses can instead be used. In this case, the Y-fitting 56 would be omitted.

Figure 8:
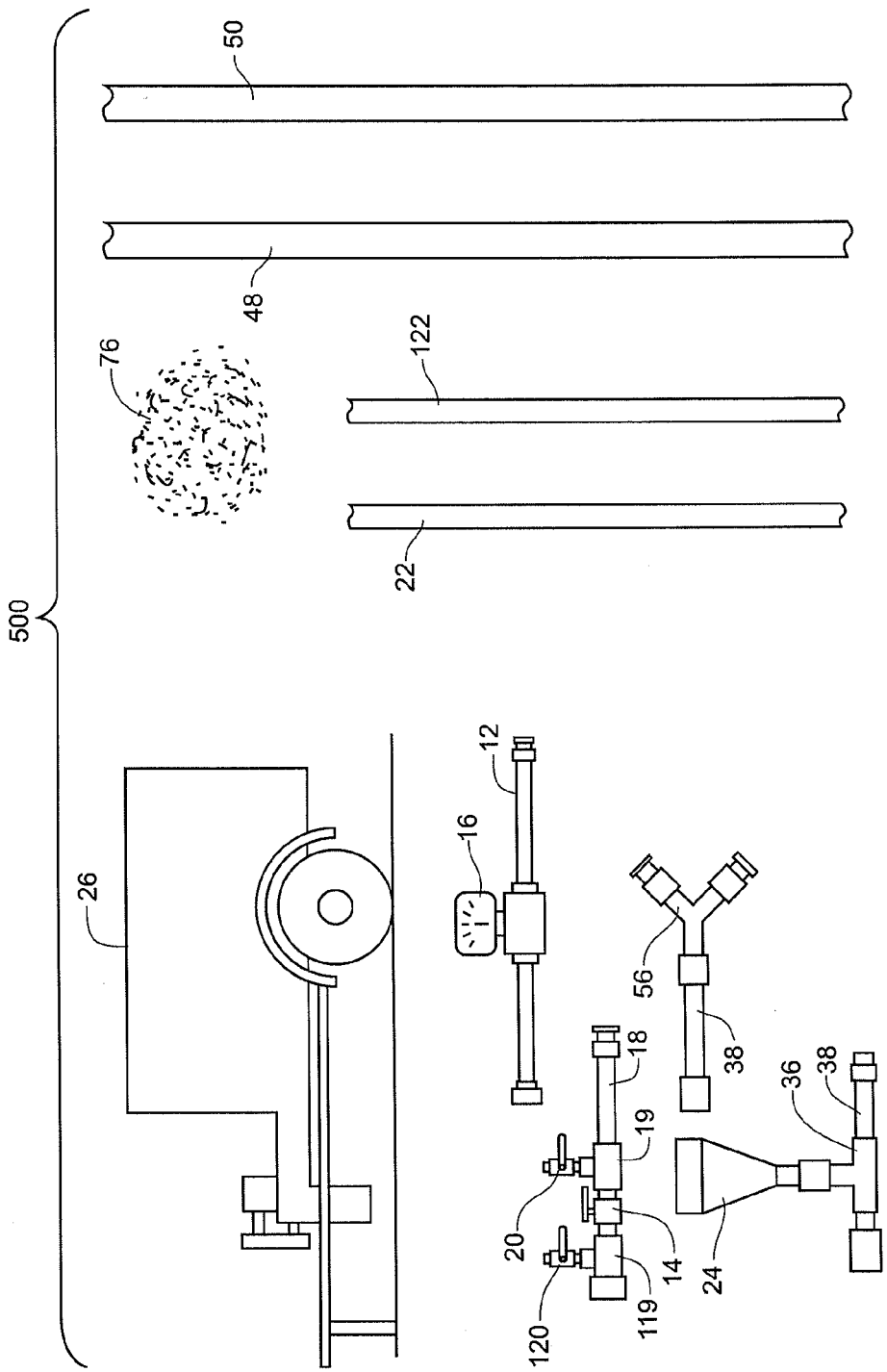
FIG. 8 is a schematic view of an equipment kit for providing an apparatus to treat low quality forage.

FIG. 8 illustrates an equipment kit 450 for providing an apparatus to treat low quality forage. The kit 450 includes a supply of treating agent 76, a treating agent processing device 26, a first pipe 12, a second pipe 1, an agitating apparatus that includes a funnel 24 and eductor 36 combination, a third pipe 38, and hoses 22, 122 and 48, 50. The treating agent device 26 can be of any of the embodiments described above. The first pipe 12 includes a water flow meter 16. The second pipe includes a main valve 14, a first fitting 19 that includes a valve 20 and a second fitting 119 that includes a valve 120. The third pipe 38 includes a Y shaped fitting 56. The hoses 22, 122 have a diameter of about 0.75 inches and the hoses 48, 50 have a diameter of about 1.5 inches in some embodiments, although this is not required.

The first pipe 12 operably connects to the second pipe 18. The second pipe 18 operably connects to the eductor 36. The eductor 36 operably connects to the third pipe 38. The hose 22 operably connects to the fitting 19 and the valve 20 controls the rate of water through the hose 22. The hose 122 operably connects to the fitting 119 and the valve 120 controls the rate of water through the hose 122. The hoses 48, 50 operably connect to outlets of the Y shaped fitting 56. This kit 450 can be provided to customers who can then install or retrofit the equipment to their existing farm equipment. For example, the first pipe 12 can operably connect to a water source and one or both hoses 48, 50 can operably connect to any type of grinding machine, including but not limited to, a tub grinding machine and a horizontal grinding machine.

In any of the embodiments described above, the treatment apparatus or kit can further include a booster pump, which can be used to help regulate water flow. Such a booster pump can be beneficial in cases where the apparatus is placed at an elevation or when one needs to regulate fluid through an educator.

In certain embodiments, the treated forage 60 contains about 5% of the treating agent on a dry matter basis. In other words, the treated forage 60 contains a mix of about 50% dry matter and about 50% moisture. A farmer then stores the treated forage 60 using any suitable storage time and storage mechanism. In some cases, the farmer stores the treated forage 60 for about 7 days before feeding the forage 60 to animals. If the forage 60 will not be fed to animals after 7 days, the farmer can store the forage 60 in a low oxygen or oxygen-free environment, such as in a bag or in a silo, in order to preserve the forage 60.

As can be appreciated, an appropriate ratio of: forage; moisture contributed by the forage itself; moisture contributed by added water; and treating agent 76, is helpful to obtaining the greatest feed performance from the low quality forage. Due to the variability of forage used, no exact ratios can be prescribed. Generally, though, the suspension that is supplied to the grinding machine(s) has a weight percent of 5 to 7% of treating agent to water. Also, the tables illustrated in FIG. 9 provide some helpful guidance to obtaining appropriate mixing ratios when calcium oxide is used as the treating agent 76.

The tables in FIGS. 9 and 10 are comprised of six groups that are divided according to the percentage of moisture contained in the untreated forage. As the headings indicate, the first two columns are the rate of untreated forage that will be fed into the first grinding machine 40 of FIG. 1 or the grinding machine 42 of FIGS. 4 and 5 or the grinding machine 400 of FIGS. 6 and 7. The third column indicates the number of pounds of calcium oxide that is fed into the agitating apparatus 24 per minute. The last column indicates the number of gallons of water that are supplied by the water source 10 per minute. Each row within a group, therefore, indicates an approximate ratio of forage to calcium oxide to water, according to the starting moisture content of the forage. These tables provide helpful guidance as to appropriate mixing ratios.

Roughly though, forage is introduced into the grinding machine(s) 42 at least about 10 tons per hour, at least about 15 tons per hour, at least about 20 tons per hour, at least about 25 tons per hour, at least about 30 tons per hour or perhaps between about 10 to about 40 tons per hour or from about 15 to about 35 tons per hour.

The calcium oxide is fed into the agitating apparatus 24 at a rate of from about 15 to about 60 pounds per minute, or perhaps from about 20 to about 50 pounds per minute or even perhaps from about 25 to about 50 pounds or from about 25 to about 45 pounds per minute or at a rate of at least about 15 pounds per minute, at least about 20 pounds per minute, at least about 25 pounds per minute, at least about 30 pounds per minute, at least about 35 pounds per minute, at least about 40 pounds per minute, or at least about 45 pounds per minute.

The water source 10 supplies water at a rate in the range of from about 25 to about 100 gallons per minute, such as from about 40 to about 100 gallons per minute, or perhaps the rate is at least about 25 gallons per minute, at least about 30 gallons per minute, at least about 35 gallons per minute, at least about 40 gallons per minute, at least about 45 gallons per minute, at least about 50 gallons per minute, at least about 55 gallons per minute, at least about 60 gallons per minute, at least about 65 gallons per minute, at least about 70 gallons per minute, at least about 75 gallons per minute, at least about 80 gallons per minute, at least about 85 gallons per minute or at least about 90 gallons per minute.

As discussed above, while it is preferable to provide the rates for water, calcium oxide or forage according to the recited ranges, the rates for any of these three can certainly be provided outside of the recited ranges. In such cases, the new rate for one of the three components can then be used to calculate new rates for the remaining three components. For example, while it is preferable that the water source 10 provide a water flow rate in the range of from about 25 to about 100 gallons per minute, the water source 10 can instead have a rate that is outside this range. When the water flow rate is less than about 25 gallons per minute or perhaps greater than about 100 gallons per minute, the new water flow rate can then be used to calculate the appropriate forage and calcium oxide rates.

The invention also provides methods for treating forage with a treating agent. Generally, the method includes steps of continuously supplying both a treating agent suspension and forage to a grinding machine and then continuously operating the grinding machine to thoroughly mix the treating agent with the forage. One embodiment of a method includes the steps of providing a grinding machine, providing a continuous supply of a suspension comprising water and a treating agent, providing a continuous supply of forage, directing the continuous supply of suspension and the continuous supply of forage into the grinding machine and continuously operating the grinding machine to produce treated forage. In some cases, the grinding machine can be a tub grinding machine and the continuous supply of forage includes a continuous supply of reduced particle forage. In other cases, the grinding machine can be a horizontal grinding machine and the continuous supply of forage includes a continuous supply of raw forage.

The continuous supply of suspension can include calcium oxide suspended in water. In some cases, the suspension has a weight percent of about 5% to about 7% of calcium oxide to water. Also, the step of providing a continuous supply of suspension can include providing suspension at a continuous rate in the range of from about 25 to about 100 gallons per minute, such as from about 40 to about 100 gallons per minute, or perhaps the rate is at least about 25 gallons per minute, at least about 30 gallons per minute, at least about 35 gallons per minute, at least about 40 gallons per minute, at least about 45 gallons per minute, at least about 50 gallons per minute, at least about 55 gallons per minute, at least about 60 gallons per minute, at least about 65 gallons per minute, at least about 70 gallons per minute, at least about 75 gallons per minute, at least about 80 gallons per minute, at least about 85 gallons per minute or at least about 90 gallons per minute.

Likewise, the step of providing a continuous supply of forage can include providing forage at a continuous rate of from about 10 to about 40 tons per hour or from about 15 to about 35 tons per hour or perhaps at a rate of at least about 10 tons per hour, at least about 15 tons per hour, at least about 20 tons per hour, at least about 25 tons per hour, at least about 30 tons per hour, at least about 35 tons per hour or at least about 40 tons per hour.

In the foregoing detailed description, the invention has been described with reference to specific embodiments. However, it can be appreciated that various modifications and changes can be made without departing from the scope of the invention.

What is claimed is:

1. A forage treatment system, comprising:
a water source;
a treating agent source;
an agitating apparatus; and
a grinding machine;
wherein the water source continuously supplies water from the water source to the agitating apparatus and from the agitating apparatus to the grinding machine, wherein the treating agent source continuously supplies treating agent to the agitating apparatus, wherein the agitating apparatus agitates the treating agent in the water so that the treating agent becomes suspended in the water as a suspension; and wherein the grinding machine continuously receives the suspension and a forage material.

2. The forage treatment system of claim 1 wherein the treating agent is calcium oxide.

3. The forage treatment system of claim 2 wherein the suspension comprises between about 5% to about 7% calcium oxide to water in weight percent.

4. The forage treatment system of claim 1 wherein the treating agent source supplies the treating agent to the agitating apparatus at a controlled rate of delivery of at least about 15 pounds per minute.

5. The forage treatment system of claim 1 wherein the water source supplies water to the agitating apparatus at a controlled rate of delivery of between about ½ to about 5 gallons per minute.

6. The forage treatment system of claim 1 wherein the grinding machine continuously receives the forage material at a rate of at least about 10 tons per hour.

7. The forage treatment system of claim 1 wherein the treating agent source is a treating agent processing device comprising:
a holding tank comprising one or more downwardly sloping sidewalls and a floor;
an outlet provided in the floor; and
a propelling mechanism that moves treating agent towards the outlet at a controlled rate.

8. The forage treatment system of claim 7 wherein the controlled rate is a rate that causes treating agent to exit the outlet at a rate of at least about 15 pounds per minute.

9. A treatment apparatus comprising:
a water source that continuously supplies water to both an agitating apparatus and a grinding machine,
a treating agent source that continuously supplies treating agent to the agitating apparatus at a rate of at least about 15 pounds per minute; and
a forage source that continuously supplies forage to the grinding machine at a rate of at least about 10 tons per hour.

10. The treatment apparatus of claim 9 wherein the water source continuously supplies water to the treatment apparatus at a rate of at least about 25 gallons per minute.

11. The treatment apparatus of claim 9 further comprising a valve that regulates the water supply to the agitating apparatus so that agitating apparatus continuously receives water at a rate of between about ½ to about 5 gallons per minute.

* * * * *